(12) United States Patent
Mogami et al.

(10) Patent No.: US 10,053,602 B2
(45) Date of Patent: Aug. 21, 2018

(54) ADHESIVE AGENT COMPOSITION

(71) Applicant: Fujikura Kasei Co., Ltd., Tokyo (JP)

(72) Inventors: Hirokazu Mogami, Kuki (JP); Masayoshi Inada, Kuki (JP)

(73) Assignee: Fujikura Kasei Co., Ltd., Tokyo (JP)

( * ) Notice: Subject to any disclaimer, the term of this patent is extended or adjusted under 35 U.S.C. 154(b) by 0 days.

(21) Appl. No.: 15/109,303

(22) PCT Filed: Sep. 26, 2014

(86) PCT No.: PCT/JP2014/075590
§ 371 (c)(1),
(2) Date: Jun. 30, 2016

(87) PCT Pub. No.: WO2015/107726
PCT Pub. Date: Jul. 23, 2015

(65) Prior Publication Data
US 2016/0326411 A1 Nov. 10, 2016

(30) Foreign Application Priority Data

Jan. 15, 2014 (JP) ................................. 2014-005143

(51) Int. Cl.
*C08F 293/00* (2006.01)
*C09J 153/00* (2006.01)

(52) U.S. Cl.
CPC ......... *C09J 153/00* (2013.01); *C08F 293/005* (2013.01); *C08F 2438/03* (2013.01)

(58) Field of Classification Search
CPC ................ C08F 293/00; C08F 293/005; C08F 297/026; C09J 153/00
See application file for complete search history.

(56) References Cited

U.S. PATENT DOCUMENTS

2004/0122161 A1* 6/2004 Paul .................... C08F 297/026
524/558
2005/0085592 A1* 4/2005 Taniguchi ............. C08F 293/00
525/242

FOREIGN PATENT DOCUMENTS

| JP | S5667380 A | 6/1981 |
|---|---|---|
| JP | 2001115124 A | 4/2001 |
| JP | 2003096421 A | 4/2003 |
| JP | 2003329837 A | 11/2003 |
| JP | 2010265477 A | 11/2010 |
| JP | 2010265482 A | 11/2010 |
| JP | 2013082772 A | 5/2013 |
| KR | 20100070328 A | 6/2010 |
| KR | 100984578 B1 | 9/2010 |
| TW | 200808842 A | 2/2008 |
| WO | 2008038794 A1 | 4/2008 |
| WO | 2008065982 A1 | 6/2008 |
| WO | 2010000725 A1 | 1/2010 |
| WO | 2010064551 A1 | 6/2010 |
| WO | 102453222 A | 5/2012 |

OTHER PUBLICATIONS

Mayadunne, R.T.A.et al. Macromolecules vol. 33 pp. 243-245 (Jan. 2000).*
Taiwan Patent Office; Office Action in Taiwanese Patent Application No. 103133465 dated Jul. 27, 2015.
Taiwan Patent Office; Office Action in Taiwanese Patent Application No. 103133465 dated Nov. 17, 2015.
European Patent Office; International Search Report in International Patent Application No. PCT/JP2014/075590 dated Jan. 6, 2015.
European Patent Office, Search Report issued in European Patent Application No. 14878704.7 dated Aug. 25, 2017, 5 pages.
Korean Patent Office, Notice of Allowance issued in Korean Patent Application No. 10-2016-7018608 dated Apr. 9, 2018, 4 pages.

* cited by examiner

*Primary Examiner* — Irina S Zemel
*Assistant Examiner* — Jeffrey S Lenihan
(74) *Attorney, Agent, or Firm* — Wood Herron & Evans LLP

(57) ABSTRACT

An adhesive composition, includes: a block copolymer (X) that includes a block (A) and a block (B), the block (A) having a glass transition point of 75° C. or higher, the block (A) including a monomer unit having a cyclic structure and a carboxyl group-containing monomer unit, the block (B) containing an acrylic acid ester unit represented by the following general Formula (1) in an amount of 70 mass % or more, the block copolymer (X) having an acid value of 8 mgKOH/g or more, in which a mass ratio of the block (A) to the block (B) (block (A)/block (B)) is 10/90 to 30/70, the block (A) is located on at least one end of the block copolymer (X), and the block (B) is sandwiched between blocks (A) at said one end of the block copolymer (X).

$$CH_2=CR^1-COOR^2 \qquad (1)$$

13 Claims, No Drawings

ADHESIVE AGENT COMPOSITION

TECHNICAL FIELD

The present invention relates to an adhesive composition. Priority is claimed on Japanese Patent Application No. 2014-005143, filed Jan. 15, 2014, the content of which is incorporated herein by reference.

BACKGROUND ART

As an adhesive for use in industries, an acrylic adhesive containing an acrylic copolymer is generally used because it can be easily manufactured at low cost.

An industrial adhesive requires durability in a wide variety of conditions depending on the application thereof. For example, an optical adhesive for bonding an optical film typified by a polarizing plate or a phase difference film to a display such as a liquid crystal panel needs to maintain the performance thereof even under an environment requiring severe conditions, such as in-car displays and outdoor displays, and requires excellent durability under a usage environment.

Particularly, in order to exhibit creep properties under a high-temperature environment (heat creep resistance), there has been proposed an acrylic adhesive composition in which the weight average molecular weight of an acrylic copolymer is set to 1,000,000 or more, and which is used in combination with a crosslinking agent (for example, Patent Document 1).

However, since the acrylic adhesive composition described in Patent Document 1 contains an acrylic copolymer having an extremely high weight average molecular weight of 1,000,000 or more, solution viscosity thereof is high, and thus a large amount of an organic solvent is required to adjust the viscosity to the extent that coating properties become excellent. Further, since the acrylic adhesive composition uses a crosslinking agent, the curing of an adhesive is required, and the variation in performance of the adhesive easily occurs due to uneven crosslinkage.

In recent years, an adhesive composition containing an acrylic triblock copolymer has been proposed instead of a crosslinked acrylic adhesive (for example, Patent Document 2).

The adhesive composition described in Patent Document 2 is a non-crosslinked adhesive, and decreases solution viscosity by using a triblock copolymer instead of an acrylic copolymer, so as to improve coating properties. However, since the adhesive composition described in Patent Document 2 has heat resistance up to approximately 90° C., it is necessary to blend a plurality of adhesives in order to exhibit higher heat creep resistance.

Meanwhile, in order to improve heat creep resistance, there has been proposed an adhesive composition in which a silane coupling agent or an isocyanate additive is added to an acrylic triblock copolymer (for example, Patent Document 3).

PRIOR ART DOCUMENTS

Patent Documents

[Patent Document 1] Japanese Unexamined Patent Application, First Publication No. 2003-329837
[Patent Document 2] PCT International Publication No. WO 2008/065982
[Patent Document 3] PCT International Publication No. WO 2010/064551

SUMMARY OF THE INVENTION

Problems to be Solved by the Invention

However, in the case of the adhesive composition described in Patent Document 3, it is necessary to blend a silane coupling agent or an isocyanate additive in order to improve heat creep resistance, and the storage stability is poor.

The present invention has been made in view of the above circumstances, and an object of the present invention is to provide an adhesive composition which has excellent heat creep resistance and good adhesiveness without deteriorating coating properties and storage stability even when a crosslinking agent or an additive is not added.

Means for Solving the Problems

An adhesive composition according to an aspect of the present invention includes: a block copolymer (X) that includes a block (A) and a block (B), the block (A) having a glass transition point of 75° C. or higher, the block (A) including a monomer unit having a cyclic structure and a carboxyl group-containing monomer unit, the block (B) containing an acrylic acid ester unit represented by the following general Formula (1) in an amount of 70 mass % or more, the block copolymer (X) having an acid value of 8 mgKOH/g or more, in which a mass ratio of the block (A) to the block (B) (block (A)/block (B)) is 10/90 to 30/70, the block (A) is located on at least one end of the block copolymer (X), and the block (B) is sandwiched between blocks (A) at said one end of the block copolymer (X).

$$CH_2=CR^1-COOR^2 \qquad (1)$$

In Formula (1), $R^1$ represents a hydrogen atom, and $R^2$ represents a linear alkyl or alkoxyalkyl group having 8 or less carbon atoms.

In the aspect, the monomer unit having the cyclic structure may be a monomer unit having an aromatic ring structure.

Effects of Invention

The adhesive composition according to the aspect of the present invention has excellent heat creep resistance and good adhesiveness without deteriorating coating properties and storage stability even when a crosslinking agent or an additive is not added.

EMBODIMENTS FOR CARRYING OUT THE INVENTION

Hereinafter, an embodiment of the present invention will be described in detail.

The adhesive composition according to the present embodiment contains a block copolymer (X) composed of a block (A) and a block (B).

In the present invention, the term "(meth)acrylic acid" is generally referred to as acrylic acid and methacrylic acid.

Further, in the present invention, the reversible addition-fragmentation chain transfer polymerization is referred to as "RAFT polymerization", and the chain transfer agent to be used in the RAFT polymerization is referred to as "RAFT agent".

<Block (A)>

The block (A) is a polymer or copolymer having a glass transition point of 75° C. or higher.

If the glass transition point is 75° C. or higher, an adhesive composition having excellent creep properties under a high-temperature environment (hereinafter, also referred to as "heat creep resistance") can be obtained. The glass transition point of the block (A) is preferably 80° C. or higher, and more preferably 90° C. or higher.

The glass transition point of the block (A) is a value calculated from the Fox equation represented by Formula (i) below.

$$1/(TgA+273.15)=\Sigma[Wa/(Tga+273.15)] \quad (i)$$

In Formula (i), TgA is the glass transition point (° C.) of the block (A), Wa is the mass fraction of a monomer a constituting the block (A), and Tga is the glass transition point (° C.) of a homopolymer of the monomer a.

Here, Tga is widely known as a characteristic value of a homopolymer. For example, as Tga, a value described in "POLYMER HANDBOOK, THIRD EDITION" or a catalog value of maker may be used.

The glass transition point of the block (A) can be adjusted according to the kind of a monomer constituting the block (A) or the blending amount thereof.

As the monomer constituting the block (A), a monomer having a cyclic structure, a carboxyl group-containing monomer, a (meth)acrylic acid ester (however, except for a monomer having a cyclic structure), and a hydroxyl group-containing monomer are exemplary examples. The block (A) includes at least a monomer unit having a cyclic structure and a carboxyl group-containing monomer unit.

As the monomer having a cyclic structure, a monomer having an aromatic ring structure and a monomer having an alicyclic structure are exemplary examples.

Examples of the monomer having an aromatic ring structure include aromatic vinyl compounds, such as styrene, α-methyl styrene, o-, m-, or p-methyl styrene, and o-, m-, or p-chlorostyrene; and (meth)acrylic acid esters having an aromatic ring structure, such as benzyl (meth)acrylate and 2-phenoxyethyl (meth)acrylate.

Examples of the monomer having an alicyclic structure include (meth)acrylic acid esters having an alicyclic structure, such as cyclohexyl (meth)acrylate, dicyclopentanyl (meth)acrylate, and isobornyl (meth)acrylate.

These monomers may be used alone or a combination of two or more kinds thereof may be used.

Among these monomers, in terms of further improving heat creep resistance, a monomer having an aromatic ring structure is preferable, and styrene is particularly preferable.

When all the structural units constituting the block (A) are set to 100 mass %, the content ratio of the monomer unit having a cyclic structure is preferably 50 mass % to 95 mass %, and more preferably 65 mass % to 90 mass %.

Examples of the carboxyl group-containing monomer include (meth)acrylic acid, β-carboxyethyl (meth)acrylate, carboxypentyl (meth)acrylate, itaconic acid, crotonic acid, maleic acid, and fumaric acid. These monomers may be used alone or a combination of two or more kinds thereof may be used.

When all the structural units constituting the block (A) are set to 100 mass %, the content ratio of the carboxyl group-containing monomer unit is preferably 3 mass % to 40 mass %, and more preferably 4 mass % to 30 mass %.

As the (meth)acrylic acid ester, (meth)acrylic acid alkyl ester not having a cyclic structure and (meth)acrylic acid alkoxyalkyl ester not having a cyclic structure are exemplary examples.

Examples of the (meth)acrylic acid alkyl ester not having a cyclic structure include methyl (meth)acrylate, ethyl (meth)acrylate, butyl (meth)acrylate, isobutyl (meth)acrylate, and 2-ethylhexyl (meth)acrylate. They may be used alone or a combination of two or more kinds thereof may be used.

Examples of the (meth)acrylic acid alkoxyalkyl ester not having a cyclic structure include 2-methoxyethyl (meth)acrylate, 2-ethoxyethyl (meth)acrylate, 2-(n-propoxy)ethyl (meth)acrylate, 2-(n-butoxy)ethyl (meth)acrylate, 3-methoxypropyl (meth)acrylate, 3-ethoxypropyl (meth)acrylate, 2-(n-propoxy)propyl acrylate, and 2-(n-butoxy)propyl (meth)acrylate. They may be used alone or a combination of two or more kinds thereof may be used.

When all the structural units constituting the block (A) are set to 100 mass %, the content ratio of the (meth)acrylic acid ester unit is preferably 5 mass % to 50 mass %, and more preferably 5 mass % to 35 mass %.

Examples of the hydroxyl group-containing monomer include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxymethylcyclohexyl) methyl acrylate. They may be used alone or a combination of two or more kinds thereof may be used.

When all the structural units constituting the block (A) are set to 100 mass %, the content ratio of the hydroxyl group-containing monomer unit is preferably 0.1 mass % to 10 mass %, and more preferably 0.5 mass % to 5 mass %.

The combination of monomers constituting the block (A) is not particularly limited as long as the block (A) has a glass transition point of 75° C. or higher and is a combination of a monomer unit having a cyclic structure and a carboxyl group-containing monomer unit. However, at least the monomer having a cyclic structure and the carboxyl group-containing monomer is used. The reason for using the monomer having a cyclic structure is as follows.

The block (A) causes a microphase separation from the difference in miscibility with the block (B) to be described later. Particularly, the block (A) obtained by using the monomer having a cyclic structure has a great difference in miscibility with the block (B), thus easily causing the microphase separation. When the block (A) causes the microphase separation, the molecular arrangement of the block copolymer (X) becomes an arrangement in which the blocks (A) or the blocks (B) are adjacent to each other. As a result, the block (A) having a glass transition point higher than that of the block (B) becomes a pseudo-crosslinking point of the block copolymers (X). Thus, it is considered that the structure of the block copolymer (X) becomes a pseudo-crosslinked structure, and thus the block copolymer (X) has the same function as the crosslinked acrylic copolymer having a high molecular weight, thereby improving the heat creep resistance of the adhesive composition.

The reason for using the carboxyl group-containing monomer is as follows.

The block (A) obtained by using the carboxyl group-containing monomer has a carboxyl group derived from the carboxyl group-containing monomer. When the block (A) has a carboxyl group, a chemical bonding force is applied to the segment of the block copolymer (X) by the hydrogen bonding between carboxyl groups, and thus heat resistance is further improved. In addition, the pseudo-crosslinked structure is easily stabilized, and thus heat creep resistance is further improved.

<Block (B)>

The block (B) is a polymer or copolymer containing an acrylic acid ester unit represented by General Formula (1) below.

$$CH_2=CR^1-COOR^2 \tag{1}$$

In Formula (1), $R^1$ is a hydrogen atom.

$R^2$ is a linear alkyl or alkoxyalkyl group having 8 or less carbon atoms. When the number of carbon atoms of $R^2$ is more than 8, sufficient adhesiveness cannot be obtained. Further, when the alkyl or alkoxyalkyl group is a branched alkyl or alkoxyalkyl group, adhesiveness is lowered.

The number of carbon atoms of $R^2$ is preferably 4 or more. When the number of carbon atoms of $R^2$ is 4 or more, the wettability of the adhesive composition to an adherend becomes good, and thus a zipping phenomenon is less likely to occur at the time of peeling.

Examples of the linear alkyl group having 8 or less carbon atoms include a methyl group, an ethyl group, a propyl group (n-propyl group), a butyl group (n-butyl group), a pentyl group, a hexyl group, a heptyl group, and an octyl group.

Examples of the linear alkoxyalkyl group having 8 or less carbon atoms include a 2-methoxyethyl group, a 2-ethoxyethyl group, a 2-(n-propoxy) ethyl group, a 2-(n-butoxy) ethyl group, a 3-methoxypropyl group, a 3-ethoxy propyl group, a 2-(n-propoxy) propyl group, and a 2-(n-butoxy) propyl group.

$R^2$ is preferably a linear alkyl group having 8 or less carbon atoms.

The block (B) is obtained at least by polymerizing an acrylic acid ester represented by General Formula (1) above. The block (B) is a homopolymer of an acrylic acid ester represented by General Formula (1) above or a copolymer obtained by copolymerizing an acrylic acid ester represented by General Formula (1) above with a monomer copolymerizable with the acrylic acid ester (hereinafter, referred to as "random monomer").

Examples of the acrylic acid ester represented by General Formula (1) above include acrylic acid alkyl esters, such as methyl acrylate, ethyl acrylate, propyl acrylate, butyl acrylate, pentyl acrylate, hexyl acrylate, heptyl acrylate, and octyl acrylate; and acrylic acid alkoxyalkyl esters, such as 2-methoxyethyl acrylate, 2-ethoxyethyl acrylate, 2-(n-propoxy) ethyl acrylate, 2-(n-butoxy) ethyl acrylate, 3-methoxypropyl acrylate, 3-ethoxypropyl acrylate, 2-(n-propoxy) propyl acrylate, and 2-(n-butoxy) propyl acrylate.

They may be used alone or a combination of two or more kinds thereof may be used. Among them, butyl acrylate is preferable.

When all the structural units constituting the block (B) are set to 100 mass %, the content ratio of the acrylic acid ester unit represented by General Formula (1) above is 70 mass % or more, preferably 80 mass % or more, and more preferably 90 mass %. When the content ratio thereof is 70 mass % or more, sufficient adhesiveness and heat creep resistance can be obtained.

As the random monomer, (meth)acrylic acid esters (hereinafter, referred to as "other (meth)acrylic acid esters") other than the acrylic acid ester represented by General Formula (1) above are exemplary examples.

Examples of other (meth)acrylic acid esters include a monomer in which $R^1$ in General Formula (1) above is a hydrogen atom or a methyl group and $R^2$ in General Formula (1) above is an alkyl or alkoxyalkyl group having more than 8 carbon atoms; a monomer in which $R^1$ is a hydrogen atom or a methyl group and $R^2$ is a branched alkyl or alkoxyalkyl group; and a monomer in which any hydrogen atom in the alkyl or alkoxyalkyl group of $R^2$ is substituted with a hydroxyl group. Specific examples thereof include nonyl (meth)acrylate, decyl (meth)acrylate, isopropyl (meth)acrylate, isobutyl (meth)acrylate, 2-ethylhexyl (meth)acrylate, cyclohexyl (meth)acrylate, isobornyl (meth)acrylate, and t-butyl (meth)acrylate. They may be used alone or a combination of two or more kinds thereof may be used.

When all the structural units constituting the block (B) are set to 100 mass %, the content ratio of the random monomer unit is 30 mass % or less, preferably 20 mass % or less, and more preferably 10 mass % or less.

The glass transition point of the block (B) is preferably −30° C. or lower, and more preferably −40° C. or lower. When the glass transition point thereof is −30° C. or lower, adhesiveness can be sufficiently expressed.

The glass transition point of the block (B) can be adjusted according to the kind of a monomer constituting the block (B) or the blending amount thereof.

The glass transition point of the block (B) is a value calculated from the Fox equation represented by Formula (ii) below.

$$1/(TgB+273.15)=\Sigma[Wb/(Tgb+273.15)] \tag{ii}$$

In Formula (ii), TgB is the glass transition point (° C.) of the block (B), Wb is the mass fraction of a monomer b constituting the block (B), and Tgb is the glass transition point (° C.) of a homopolymer of the monomer b.

Here, Tgb is widely known as a characteristic value of a homopolymer. For example, as Tgb, a value described in "POLYMER HANDBOOK, THIRD EDITION" or a catalog value of maker may be used.

<Block Copolymer (X)>

The block copolymer (X) is formed from the aforementioned block (A) and block (B).

The ratio of the block (A) to the block (B) (block (A)/block (B)) is 10/90 to 30/70, and preferably 15/85 to 25/75. When the ratio of the block (A) increases, adhesiveness is lowered, and thus a zipping phenomenon easily occurs at the time of peeling. In contrast, when the ratio of the block (A) decreases, heat creep resistance deteriorates.

The block (A) is located on at least one end (first end) of the block copolymer (X). The block (B) is sandwiched between the blocks (A) at one end (first end) of the block copolymer (X). When the block (A) is located on at least one end of the block copolymer (X), an adhesive composition having excellent heat creep resistance is obtained. Further, when the block (B) is sandwiched between the blocks (A) at one end of the block copolymer (X), the aforementioned microphase separation easily occurs, and thus heat creep resistance is further improved. In particular, the block copolymer (X) is preferably a triblock copolymer represented by block (A)-block (B)-block (A).

The acid value of the block copolymer (X) is 8 mgKOH/g or more. When the acid value thereof is less than 8 mgKOH/g, the block copolymer (X) is difficult to form the aforementioned pseudo-crosslinked structure, and heat creep resistance is lowered. In terms of further improving storage stability, the acid value of the block copolymer (X) is preferably 50 mgKOH/g or less, and more preferably 40 mgKOH/g or less.

Here, the acid value of the block copolymer (X) refers to the number of mg of potassium hydroxide which is necessary for neutralizing the acid contained in 1 g of the block copolymer (X).

The weight average molecular weight (the mass average molecular weight) of the block copolymer (X) is preferably 100,000 to 550,000.

When the weight average molecular weight thereof is 100,000 or more, heat creep resistance is further improved. Meanwhile, when the weight average molecular weight thereof is 550,000 or less, coating properties are further improved.

The weight average molecular weight of the block copolymer (X) is a value measured by gel permeation chromatography. Specifically, the weight average molecular weight thereof refers to a value which is measured by using tetrahydrofuran (THF) as a mobile phase under a condition of a flow rate of 1.0 mL/min through gel permeation chromatography and is converted into polystyrene.

(Method of Manufacturing Block Copolymer (X))

The block copolymer (X) is obtained, for example, by living polymerization. As the living polymerization, living anionic polymerization and RAFT polymerization are exemplary examples, and, particularly, RAFT polymerization is preferable.

In the case where the block copolymer (X) is manufactured by RAFT polymerization, the block (A) is obtained by polymerizing or copolymerizing the monomers constituting the block (A) using a RAFT agent. Thereafter, the monomers constituting the block (B) are polymerized or copolymerized in the presence of the obtained block (A), thereby manufacturing the block copolymer (X).

As the RAFT agent used in RAFT polymerization, sulfur-based compounds, such as dithioester, dithiocarbonate, trithiocarbonate, and xanthate, can be used.

As the polymerization initiator used in RAFT polymerization, known azo-based polymerization initiators or peroxide-based polymerization initiators can be used.

The solvent used in RAFT polymerization is not particularly limited, and commonly known solvents can be used as the solvent.

The method of RAFT polymerization is not particularly limited, and commonly known methods, such as solution polymerization, emulsion polymerization, bulk polymerization, and suspension polymerization, can be employed.

<Other Components>

The adhesive composition according to the present embodiment, if necessary, may contain additives, such as an ultraviolet absorber, an antioxidant, a preservative, a fungicide, a plasticizer, an antifoaming agent, a wettability adjusting agent, and a tackifier. In terms of maintaining good storage stability, it is preferable that the adhesive composition do not contain isocyanate or a silane coupling agent.

<Functions and Effects>

Since the aforementioned adhesive composition according to an embodiment of the present invention includes the block copolymer (X) composed of the block (A) and the block (B), adhesiveness and creep properties in a high-temperature environment are excellent. As described above, the block copolymer (X) causes a microphase separation by the difference in miscibility of the block (A) and the block (B). As a result, the block (A) becomes a pseudo-crosslinking point of the block copolymers (X). Moreover, the pseudo-crosslinking point is maintained by forming the microphase separation structure between molecules more clearly. Thus, it is considered that the structure of the block copolymer (X) becomes a pseudo-crosslinked structure, and thus the performance of an adhesive is maintained even in a high-temperature environment, thereby making the adhesiveness and heat creep resistance of the adhesive composition excellent.

Further, the adhesive composition according to the present embodiment is merely to form a pseudo-crosslinked structure. That is, in fact, since the adhesive composition has a non-crosslinked structure, the adhesive composition has a low molecular weight (specifically, weight average molecular weight is preferably 100,000 to 550,000) and is thus excellent in coating properties. Therefore, since, unnecessary dilution of the adhesive composition by a solvent is not required, it is possible to make thick coating with a small number of coating times.

Thus, the adhesive composition according to the present embodiment is also suitable as an adhesive in the field (for example, a touch panel, etc.) in which an adhesive layer requires thickness.

Moreover, since the adhesive composition according to the present embodiment is excellent in heat creep resistance, it is not required to blend a silane coupling agent or an isocyanate additive, as the adhesive described in Patent Document 3. Accordingly, the adhesive composition according to the present embodiment is excellent even in storage stability.

EXAMPLES

Hereinafter, the present invention will be described in detail by Examples, but the present invention is not limited thereto.

Preparation Example 1: Preparation of RAFT Agent (R-1)

0.902 g (6.00 mmol) of 1,6-hexanediol, 1.83 g (24.0 mmol) of carbon disulfide, and 11 mL of dimethylformamide were put into a two-neck flask, and were stirred at 25° C. using a magnetic stirrer. 2.49 g (24.6 mmol) of triethylamine was dropped thereto over a period of 15 minutes, and stirring was further performed at 25° C. for 3 hours. After the dropping, it was found that the color of the reaction solution in the flask was changed from colorless and transparent to yellow.

Subsequently, 2.75 g (12.0 mmol) of methyl-α-bromophenylacetic acid was dropped thereto over a period of 15 minutes, and stirring was further performed at 25° C. for 4 hours. During the dropping, the precipitate in the flask was observed.

Then, 100 mL of an extraction solvent (n-hexane/ethyl acetate=50/50) and 50 mL of water were added to the reaction solution, and liquid separating extraction was performed. 50 ml of the same extraction solvent as the above extraction solvent was added to the obtained aqueous phase, and liquid separating extraction was further performed. Organic phases obtained by the first and second liquid separating extractions were mixed, and this organic phase mixture was washed with 50 mL of 1 M hydrochloric acid, 50 mL of water, and 50 mL of saturated saline in this order. After sodium sulfate was added to the washed organic phase mixture and dried, sodium sulfate was filtered to obtain a filtrate, the filtrate was concentrated by an evaporator, and the organic solvent was removed under reduced pressure to obtain a concentrate. The obtained concentrate was purified by silica gel column chromatography (developing solvent: n-hexane/ethyl acetate=80/20) to obtain 2.86 g (yield 80%) of a RAFT agent (R-1) as yellow oily matter.

The attribution of $^1$H-NMR spectrum of the obtained RAFT agent (R-1) is shown below. Here, the nuclear magnetic resonance analyzer ("R-1200", manufactured by Hitachi, Ltd.) was used in the $^1$H-NMR measurement.

$^1$H-NMR (60 MHz in CDCl$_3$): δ7.50-7.05 (m, 10H, ArH), δ5.82 (s, 2H, CH—COO), δ3.73 (s, 6H, CH$_3$), δ3.33 (brt, 4H, S—CH$_2$), δ1.85-1.22 (m, 8H, CH$_2$).

From $^1$H-NMR spectrum, it was able to confirm the structure of the alkyl group derived from methyl-α-phenyl acetic acid and dithiol. Therefore, it was determined in Preparation Example 1 that a compound (compound (2)) represented by General Formula (2) below was obtained as the RAFT agent (R-1).

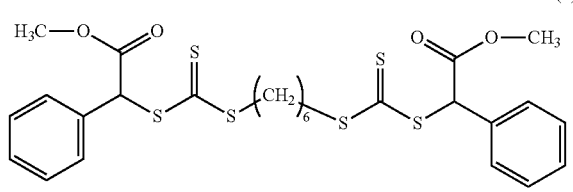

(2)

Preparation Example 2: Preparation of RAFT Agent (R-2)

2.25 g (yield 98%) of a RAFT agent (R-2) was obtained as yellow oily matter in the same manner as Preparation Example 1, except that 0.902 g (6.00 mmol) of 1,6-hexanedithiol was changed to 1.214 g (6.00 mmol) of 1-dodecanethiol, the amount of carbon disulfide was changed from 1.83 g (24.0 mmol) to 0.915 g (12.0 mmol), the amount of triethylamine was changed from 2.49 g (24.6 mmol) to 1.25 g (12.3 mmol), and 2.75 g (12.0 mmol) of methyl-α-bromophenylacetic acid was changed to 1.11 g (6.00 mmol) of (1-bromoethyl)benzene.

The attribution of $^1$H-NMR spectrum of the obtained RAFT agent (R-2) is shown below.

$^1$H-NMR (60 MHz in CDCl$_3$): δ7.60-7.12 (m, 5H, ArH), δ5.34 (q, J=6.9 Hz, 1H, S—CH), δ3.34 (brt, 2H, S—CH$_2$), δ1.76 (d, J=6.9 Hz, 3H, CH3), δ1.70-1.05 (m, 20H, —CH$_2$—), δ0.89 (brt, 3H, CH$_3$).

From $^1$H-NMR spectrum, it was able to confirm the structure of the alkyl group derived from (1-bromoethyl)benzene and dodecanethiol. Therefore, it was determined in Preparation Example 2 that a compound (compound (3)) represented by General Formula (3) below was obtained as the RAFT agent (R-2).

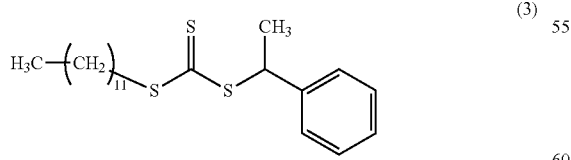

(3)

<Measurement and Evaluation>
(Calculation of Glass Transition Point)

The glass transition point of the block (A) was calculated from the Fox equation represented by Formula (i) above, and the glass transition point of the block (B) was calculated from the Fox equation represented by Formula (ii) above.

(Measurement of Molecular Weight)

Number average molecular weight (Mn) and weight average molecular weight (Mw) were measured by gel permeation chromatography (GPC) in the following conditions. Here, the number average molecular weight (Mn) and weight average molecular weight (Mw) are polystyrene-converted values.

Measurement Conditions of GPC:
GPC apparatus: GPC-101 (manufactured by Shoko Co., Ltd.)
Column: Shodex A-806M×2 in serial connection (manufactured by Showa Denko K.K.)
Detector: Shodex RI-71 (manufactured by Showa Denko K.K.)
Mobile phase: tetrahydrofuran
Flow rate: 1 mL/min (Measurement of Acid Value)

Acid value was measured by titrating a solution prepared by dissolving potassium hydroxide in methanol so as to be 0.1 N potassium hydroxide.

(Measurement of Adhesiveness)

An adhesive composition was applied to the center of a stainless steel plate having a size of 30 mm×40 mm so as to be a thickness of 25 μm after drying, thereby forming an adhesive layer having a size of 25 mm×25 mm. Through this adhesive layer, the stainless steel plate was attached to a polyethylene terephthalate (PET) film having a size of 25 mm×100 mm, so as to make a test piece.

The adhesiveness of the PET film of the test piece was measured based on 8.3.1 "180-degree peeling method" of JIS Z 0237: 2009.

(Evaluation of Heat Creep Resistance)

A test piece was made in the same manner as in the case of measurement of adhesiveness.

Based on JIS Z 0237: 2009, a press roll reciprocated once from the PET film side of the test piece, and the test piece was then provided in a creep testing machine which was adjusted to 40° C. In an environment of 100° C. or 150° C., the time taken for the PET film provided with a weight of 1 kg to fall from the stainless steel plate was measured. Here, in the case where the PET film does not fall from the stainless steel plate even after 1 hour, the displacement of the PET film (distance from position before test) after 1 hour was measured. Fall time (min) or displacement (mm) is an index of heat creep resistance, which means that, as the displacement (mm) decreases, the heat creep resistance becomes excellent. Further, in the case where the PET film falls from the stainless steel plate, it means that, as the fall time (min) increases, the heat creep resistance becomes excellent. A case of the PET film not falling or a case of the fall time being 30 minutes or more was passed.

(Evaluation of Coating Properties)

An adhesive composition was diluted with ethyl acetate to prepare a diluted solution. The concentration of the adhesive composition in the diluted solution was increased by 5%. The diluted solution was applied onto the PET film using bar coater No. 26 in order of high concentration. When streaks on the coating film, entrainment of bubble, and fluctuation of the surface of the coating film was not observed, the concentration of the adhesive composition in the diluted solution was determined, which was used as the evaluation of coating properties. It means that, as the concentration of the adhesive composition increases, the coating properties become excellent.

Example 1

<Preparation of Block Copolymer (X)>
(Preparation of Block (A))

84.6 g of styrene (St), 1.4 g of 2-hydroxyethyl acrylate (HEA), 14 g of acrylic acid (AA), 1.9 g of RAFT agent (R-1), and 0.35 g of 2,2'-azobis (2-methylbutyronitrile) (ABN-E) were put into a two-neck flask, and the inside of the flask was heated to 85° C. while being replaced with nitrogen gas. Thereafter, stirring was carried out at 85° C. for 6 hours to perform a polymerization reaction (first stage reaction).

After the completion of the reaction, 4000 g of n-hexane was put into the flask, and stirring was carried out to precipitate the reactants. Then, the unreacted monomers (St, HEA, and AA) and the RAFT agent were filtered, and the reactants were dried at 70° C. under reduced pressure, so as to obtain a copolymer (block (A)).

The glass transition point, number average molecular weight (Mn), and weight average molecular weight (Mw) of the obtained copolymer (block (A)) are shown in Table 1.

(Preparation of Block Copolymer (X))

A mixture containing 100 g of butyl acrylate (BA), 0.027 g of ABN-E and 50 g of ethyl acetate, and the previously obtained copolymer (block (A)) were put into a two-neck flask, and the inside of the flask was heated to 85° C. while being replaced with nitrogen gas. Thereafter, stirring was carried out at 85° C. for 6 hours to perform a polymerization reaction (second stage reaction), so as to obtain a reaction solution containing a block copolymer (X) formed from the block (A) and block (B). Here, the blending amount of the mixture and the block (A) was set such that the mass ratio of block (A) to block (B) in the obtained of block copolymer (X) is 25/75.

A part of the reaction solution was extracted, 4000 g of n-hexane was added to the part of the reaction solution, and stirring was carried out to precipitate the reactants. Then, the unreacted monomer (BA) and the solvent were filtered, and the reactants were dried at 70° C. under reduced pressure, so as to extract a block copolymer (X) from the reaction solution.

The glass transition point of the block (B) is shown in Table 1. Further, the number average molecular weight (Mn), weight average molecular weight (Mw), and acid value of the block copolymer (X) are shown in Table 1.

Further, the adhesiveness of an adhesive composition was measured using the reaction solution containing the block copolymer (X) as the adhesive composition, and the heat creep resistance and coating properties of the adhesive composition were evaluated using the same. The results thereof are shown in Table 1.

Examples 2 to 9

Each block copolymer (X) was prepared in the same manner as Example 1, except that the monomer composition constituting the block (A) and block (B) was changed as shown in Table 1, the polymerization conditions of the first stage reaction and the second stage reaction were changed as shown in Table 1, and the mass ratio of the block (A) to the block (B) was changed as shown in Table 1. The various measurements and evaluations of the prepared block copolymers (X) were performed. The results thereof are shown in Table 1.

In Examples 7 and 8, 67.7 g of ethyl acetate was used as the solvent in the first stage reaction.

Comparative Examples 1 to 16

Each block copolymer (X) was prepared in the same manner as Example 1, except that the monomer composition constituting the block (A) and block (B) was changed as shown in Tables 2 and 3, the polymerization conditions of the first stage reaction and the second stage reaction were changed as shown in Tables 2 and 3, and the mass ratio of the block (A) to the block (B) was changed as shown in Tables 2 and 3. The various measurements and evaluations of the prepared block copolymers (X) were performed. The results thereof are shown in Tables 2 and 3.

Comparative Example 17

18.2 g of St, 1.8 g of AA, 80 g of BA, 0.5 g of ABN-E, and 200 g of ethyl acetate were put into a two-neck flask, and the inside of the flask was heated to 85° C. while being replaced with nitrogen gas. Thereafter, stirring was carried out at 85° C. for 6 hours to perform a polymerization reaction, so as to obtain a reaction solution containing a random copolymer.

A part of the extracted reaction solution and 4000 g of n-hexane were put into the flask, and stirring was carried out to precipitate the reactants. Then, the unreacted monomers (St, AA, and BA) and the solvent were filtered, and the reactants were dried at 70° C. under reduced pressure, so as to extract a random copolymer from the reaction solution.

The number average molecular weight (Mn), weight average molecular weight (Mw), and acid value of the obtained random copolymer are shown in Table 4.

Further, the adhesiveness of an adhesive composition was measured using the reaction solution containing the random copolymer as the adhesive composition, and the heat creep resistance and coating properties of the adhesive composition were evaluated using the same. The results thereof are shown in Table 4.

Comparative Example 18

18.2 g of methyl methacrylate (MMA), 1.8 g of AA, 80 g of BA, 0.02 g of ABN-E, and 66.7 g of ethyl acetate were put into a two-neck flask, and the inside of the flask was heated to 85° C. while being replaced with nitrogen gas. Thereafter, a random copolymer was prepared in the same manner as in Comparative Example 17, except that stirring was carried out at 85° C. for 6 hours to perform a polymerization reaction. The various measurements and evaluations of the prepared random copolymer were performed. The results thereof are shown in Table 4.

TABLE 1

| | | | Example 1 | Example 2 | Example 3 | Example 4 | Example 5 |
|---|---|---|---|---|---|---|---|
| Block (A) | Monomer composition [g] | St | 84.6 | 86.3 | 90.9 | 91.3 | 86.3 |
| | | CHMA | 0 | 0 | 0 | 0 | 0 |
| | | HEA | 1.4 | 2.3 | 2.6 | 0 | 2.3 |
| | | HEMA | 0 | 0 | 0 | 0 | 0 |

TABLE 1-continued

|  |  |  |  |  |  |  |  |
|---|---|---|---|---|---|---|---|
|  |  | MAA | 0 | 0 | 0 | 0 | 0 |
|  |  | AA | 14 | 11.4 | 6.5 | 8.7 | 11.4 |
|  | Polymerization condition | Ethyl acetate | 0 | 0 | 0 | 0 | 0 |
|  | [g] | ABN-E | 0.35 | 0.15 | 0.15 | 0.2 | 0.15 |
|  |  | RAFT agent (R-1) | 1.9 | 3 | 3 | 3 | 3 |
|  | Glass transition point [° C.] |  | 99 | 97 | 96 | 101 | 97 |
|  | Number average molecular weight (Mn) |  | 19000 | 27000 | 25000 | 24000 | 27000 |
|  | Weight average molecular weight (Mw) |  | 30000 | 44000 | 38000 | 37000 | 44000 |
|  | Mw/Mn |  | 1.6 | 1.6 | 1.5 | 1.5 | 1.6 |
| Block (B) | Monomer composition | BA | 100 | 100 | 100 | 100 | 100 |
|  | [g] | EHA | 0 | 0 | 0 | 0 | 0 |
|  | Polymerization condition | Ethyl acetate | 50 | 50 | 50 | 50 | 50 |
|  | [g] | ABN-E | 0.027 | 0.015 | 0.037 | 0.058 | 0.023 |
|  | Ratio of unit (1) [mass %] |  | 100 | 100 | 100 | 100 | 100 |
|  | Glass transition point [° C.] |  | −54 | −54 | −54 | −54 | −54 |
| Block copolymer (X) | Block (A)/block (B) |  | 25/75 | 10/90 | 23/77 | 23/77 | 30/70 |
|  | Number average molecular weight (Mn) |  | 75000 | 170000 | 100000 | 100000 | 80000 |
|  | Weight average molecular weight (Mw) |  | 140000 | 521000 | 257000 | 255000 | 190000 |
|  | Mw/Mn |  | 1.9 | 3.1 | 2.6 | 2.6 | 2.4 |
|  | Acid value [mgKOH/g] |  | 28.5 | 9.5 | 8.9 | 8.8 | 28.7 |
| Evaluation | Adhesiveness [N/25 mm] |  | 22.5 | 22 | 31 | 31 | 12.5 |
|  | Heat creep resistance | 100° C. × 1 kg | 0 mm | 1 mm | 0 mm | 0.5 mm | 0.5 mm |
|  |  | 150° C. × 1 kg | 0 mm | 0 mm | 0 mm | 0 mm | 0 mm |
|  | Coating properties | Concentration [mass %] | 35 | 35 | 35 | 35 | 35 |

|  |  |  | Example 6 | Example 7 | Example 8 | Example 9 |
|---|---|---|---|---|---|---|
| Block (A) | Monomer composition | St | 86.3 | 0 | 0 | 84.6 |
|  | [g] | CHMA | 0 | 87.7 | 87.7 | 0 |
|  |  | HEA | 2.3 | 0 | 0 | 1.4 |
|  |  | HEMA | 0 | 1.3 | 1.3 | 0 |
|  |  | MAA | 0 | 11 | 11 | 0 |
|  |  | AA | 11.4 | 0 | 0 | 14 |
|  | Polymerization condition | Ethyl acetate | 0 | 67.7 | 67.7 | 0 |
|  | [g] | ABN-E | 0.15 | 0.1 | 0.1 | 0.35 |
|  |  | RAFT agent (R-1) | 3 | 1.5 | 1.5 | 1.9 |
|  | Glass transition point [° C.] |  | 97 | 78 | 78 | 99 |
|  | Number average molecular weight (Mn) |  | 27000 | 27000 | 27000 | 19000 |
|  | Weight average molecular weight (Mw) |  | 44000 | 38000 | 38000 | 30000 |
|  | Mw/Mn |  | 1.6 | 1.4 | 1.4 | 1.6 |
| Block (B) | Monomer composition | BA | 100 | 100 | 100 | 73 |
|  | [g] | EHA | 0 | 0 | 0 | 27 |
|  | Polymerization condition | Ethyl acetate | 50 | 50 | 50 | 50 |
|  | [g] | ABN-E | 0.032 | 0.0086 | 0.0045 | 0.071 |
|  | Ratio of unit (1) [mass %] |  | 100 | 100 | 100 | 73 |
|  | Glass transition point [° C.] |  | −54 | −54 | −54 | −59 |
| Block copolymer (X) | Block (A)/block (B) |  | 25/75 | 13/87 | 26/74 | 25/75 |
|  | Number average molecular weight (Mn) |  | 93000 | 135000 | 71000 | 121000 |
|  | Weight average molecular weight (Mw) |  | 238000 | 248000 | 105000 | 228000 |
|  | Mw/Mn |  | 2.6 | 1.8 | 1.5 | 1.9 |
|  | Acid value [mgKOH/g] |  | 14 | 11.9 | 21.1 | 28.5 |
| Evaluation | Adhesiveness [N/25 mm] |  | 35 | 11 | 18 | 11 |
|  | Heat creep resistance | 100° C. × 1 kg | 0 mm | 0 mm | 0 mm | 0 mm |
|  |  | 150° C. × 1 kg | 0 mm | 37 min | 0.5 mm | 0 mm |
|  | Coating properties | Concentration [mass %] | 35 | 30 | 30 | 35 |

TABLE 2

|  |  |  | Comparative Example 1 | Comparative Example 2 | Comparative Example 3 | Comparative Example 4 |
|---|---|---|---|---|---|---|
| Block (A) | Monomer composition | St | 84.6 | 90.9 | 100 | 100 |
|  | [g] | MA | 0 | 0 | 0 | 0 |
|  |  | HEA | 1.4 | 2.6 | 0 | 0 |
|  |  | AA | 14 | 6.5 | 0 | 0 |
|  | Polymerization condition | ABN-E | 0.35 | 0.15 | 0.2 | 0.2 |
|  | [g] | RAFT agent (R-1) | 1.9 | 3 | 2.4 | 2.4 |
|  | Glass transition point [° C.] |  | 99 | 96 | 100 | 100 |
|  | Number average molecular weight (Mn) |  | 19000 | 25000 | 29000 | 29000 |
|  | Weight average molecular weight (Mw) |  | 30000 | 38000 | 39000 | 39000 |
|  | Mw/Mn |  | 1.6 | 1.5 | 1.3 | 1.3 |

TABLE 2-continued

|  |  |  |  |  |  |  |
|---|---|---|---|---|---|---|
| Block (B) | Monomer composition [g] | BA | 100 | 100 | 100 | 100 |
|  |  | EHA | 0 | 0 | 0 | 0 |
|  | Polymerization condition [g] | Ethyl acetate | 50 | 50 | 50 | 50 |
|  |  | ABN-E | 0.057 | 0.024 | 0.018 | 0.0467 |
|  | Ratio of unit (1) [mass %] |  | 100 | 100 | 100 | 100 |
|  | Glass transition point [° C.] |  | −54 | −54 | −54 | −54 |
| Block copolymer (X) | Block (A)/block (B) |  | 35/65 | 14/86 | 12/88 | 25/75 |
|  | Number average molecular weight (Mn) |  | 58000 | 129000 | 136000 | 79700 |
|  | Weight average molecular weight (Mw) |  | 98000 | 383000 | 419000 | 174000 |
|  | Mw/Mn |  | 1.7 | 3.0 | 3.1 | 2.2 |
|  | Acid value [mgKOH/g] |  | 36.9 | 7 | 0 | 0 |
| Evaluation | Adhesiveness [N/25 mm] |  | 3 | 35 | 36 | 27 |
|  | Heat creep resistance | 100° C. × 1 kg | 0 mm | 4 mm | 31 min | 15 min |
|  |  | 150° C. × 1 kg | 0 mm | 1 min | 1 min | 1 min |
|  | Coating properties | Concentration [mass %] | 35 | 35 | 35 | 35 |

|  |  |  | Comparative Example 5 | Comparative Example 6 | Comparative Example 7 | Comparative Example 8 |
|---|---|---|---|---|---|---|
| Block (A) | Monomer composition [g] | St | 0 | 0 | 85.2 | 85.2 |
|  |  | MA | 86.7 | 88 | 0 | 0 |
|  |  | HEA | 0 | 0 | 1.3 | 1.3 |
|  |  | AA | 13.3 | 12 | 13.5 | 13.5 |
|  | Polymerization condition [g] | ABN-E | 0.2 | 0.2 | 0.3 | 0.3 |
|  |  | RAFT agent (R-1) | 2.2 | 2.2 | 1.7 | 1.7 |
|  | Glass transition point [° C.] |  | 20 | 19 | 99 | 99 |
|  | Number average molecular weight (Mn) |  | 23000 | 23000 | 19000 | 19000 |
|  | Weight average molecular weight (Mw) |  | 39000 | 39000 | 28000 | 28000 |
|  | Mw/Mn |  | 1.7 | 1.7 | 1.5 | 1.5 |
| Block (B) | Monomer composition [g] | BA | 100 | 100 | 0 | 0 |
|  |  | EHA | 0 | 0 | 100 | 100 |
|  | Polymerization condition [g] | Ethyl acetate | 50 | 50 | 50 | 50 |
|  |  | ABN-E | 0.0753 | 0.0747 | 0.025 | 0.040 |
|  | Ratio of unit (1) [mass %] |  | 100 | 100 | 0 | 0 |
|  | Glass transition point [° C.] |  | −54 | −54 | −70 | −70 |
| Block copolymer (X) | Block (A)/block (B) |  | 15/85 | 25/75 | 20/80 | 25/75 |
|  | Number average molecular weight (Mn) |  | 132000 | 86000 | 47000 | 38000 |
|  | Weight average molecular weight (Mw) |  | 328000 | 184000 | 92000 | 70000 |
|  | Mw/Mn |  | 2.5 | 2.1 | 2.0 | 1.8 |
|  | Acid value [mgKOH/g] |  | 15.5 | 23.4 | 19.3 | 24.9 |
| Evaluation | Adhesiveness [N/25 mm] |  | 16.5 | 16 | 0.5 | 0.5 |
|  | Heat creep resistance | 100° C. × 1 kg | 1 min | 1 min | 0 mm | 0 mm |
|  |  | 150° C. × 1 kg | 1 min | 1 min | 0 mm | 0 mm |
|  | Coating properties | Concentration [mass %] | 35 | 35 | 35 | 35 |

TABLE 3

|  |  |  | Comparative Example 9 | Comparative Example 10 | Comparative Example 11 | Comparative Example 12 |
|---|---|---|---|---|---|---|
| Block (A) | Monomer composition [g] | St | 100 | 100 | 84.6 | 81 |
|  |  | MMA | 0 | 0 | 0 | 0 |
|  |  | EMA | 0 | 0 | 0 | 0 |
|  |  | HEA | 0 | 0 | 1.4 | 1.5 |
|  |  | HEMA | 0 | 0 | 0 | 0 |
|  |  | MAA | 0 | 0 | 0 | 0 |
|  |  | AA | 0 | 0 | 14 | 17.5 |
|  | Polymerization condition [g] | Ethyl acetate | 0 | 0 | 0 | 0 |
|  |  | ABN-E | 0.2 | 0.2 | 0.35 | 0.2 |
|  |  | RAFT agent (R-1) | 2.4 | 2.4 | 1.9 | 0 |
|  |  | RAFT agent (R-2) | 0 | 0 | 0 | 1.2 |
|  | Glass transition point [° C.] |  | 100 | 100 | 99 | 99 |
|  | Number average molecular weight (Mn) |  | 29000 | 29000 | 19000 | 21000 |
|  | Weight average molecular weight (Mw) |  | 39000 | 39000 | 30000 | 26000 |
|  | Mw/Mn |  | 1.3 | 1.3 | 1.6 | 1.2 |
| Block (B) | Monomer composition [g] | BA | 95.3 | 96.1 | 48.4 | 100 |
|  |  | EHA | 0 | 0 | 48.4 | 0 |
|  |  | HEA | 0.8 | 0.7 | 0.5 | 0 |
|  |  | AA | 3.9 | 3.2 | 2.7 | 0 |

TABLE 3-continued

|  |  |  |  |  |  |  |
|---|---|---|---|---|---|---|
| | Polymerization condition [g] | Ethyl acetate | 50 | 50 | 50 | 50 |
| | | ABN-E | 0.0229 | 0.0253 | 0.0683 | 0.075 |
| | Ratio of unit (1) [mass %] | | 95.3 | 96.1 | 48.4 | 100 |
| | Glass transition point [° C.] | | −51 | −51 | −62.3 | −54 |
| Block copolymer (X) | Block (A)/block (B) | | 25/75 | 25/75 | 15/85 | 20/80 |
| | Number average molecular weight (Mn) | | 80000 | 81000 | 150000 | 82000 |
| | Weight average molecular weight (Mw) | | 177000 | 185000 | 360000 | 183000 |
| | Mw/Mn | | 2.2 | 2.3 | 2.4 | 2.2 |
| | Acid value [mgKOH/g] | | 17.6 | 18.4 | 9.5 | 28.4 |
| Evaluation | Adhesiveness [N/25 mm] | | 32.5 | 38 | 4 | 26.5 |
| | Heat creep resistance | 100° C. × 1 kg | 1 mm | 0 mm | 0 mm | 0 mm |
| | | 150° C. × 1 kg | 3 min | 8 min | 0 mm | 1 min |
| | Coating properties | Concentration [mass %] | 35 | 35 | 35 | 35 |

|  |  |  | Comparative Example 13 | Comparative Example 14 | Comparative Example 15 | Comparative Example 16 |
|---|---|---|---|---|---|---|
| Block (A) | Monomer composition [g] | St | 81 | 0 | 0 | 0 |
| | | MMA | 0 | 100 | 0 | 0 |
| | | EMA | 0 | 0 | 86.3 | 86.3 |
| | | HEA | 1.5 | 0 | 0 | 0 |
| | | HEMA | 0 | 0 | 1.5 | 1.5 |
| | | MAA | 0 | 0 | 12.2 | 12.2 |
| | | AA | 17.5 | 0 | 0 | 0 |
| | Polymerization condition [g] | Ethyl acetate | 0 | 67.7 | 67.7 | 67.7 |
| | | ABN-E | 0.2 | 0.05 | 0.1 | 0.1 |
| | | RAFT agent (R-1) | 0 | 1.8 | 1.7 | 1.7 |
| | | RAFT agent (R-2) | 1.2 | 0 | 0 | 0 |
| | Glass transition point [° C.] | | 99 | 105 | 79 | 79 |
| | Number average molecular weight (Mn) | | 21000 | 26000 | 27000 | 27000 |
| | Weight average molecular weight (Mw) | | 26000 | 36000 | 40000 | 40000 |
| | Mw/Mn | | 1.2 | 1.4 | 1.5 | 1.5 |
| Block (B) | Monomer composition [g] | BA | 73 | 100 | 100 | 100 |
| | | EHA | 27 | 0 | 0 | 0 |
| | | HEA | 0 | 0 | 0 | 0 |
| | | AA | 0 | 0 | 0 | 0 |
| | Polymerization condition [g] | Ethyl acetate | 50 | 50 | 50 | 50 |
| | | ABN-E | 0.0707 | 0.0221 | 0.0086 | 0.0227 |
| | Ratio of unit (1) [mass %] | | 73 | 100 | 100 | 100 |
| | Glass transition point [° C.] | | −54 | −54 | −54 | −54 |
| Block copolymer (X) | Block (A)/block (B) | | 30/70 | 23/77 | 13/87 | 25/75 |
| | Number average molecular weight (Mn) | | 59000 | 57000 | 120000 | 79000 |
| | Weight average molecular weight (Mw) | | 96000 | 68000 | 235000 | 129000 |
| | Mw/Mn | | 1.6 | 1.2 | 2.0 | 1.6 |
| | Acid value [mgKOH/g] | | 39.2 | 0 | 14.5 | 23.9 |
| Evaluation | Adhesiveness [N/25 mm] | | 12 | 0.5 | 17 | 15 |
| | Heat creep resistance | 100° C. × 1 kg | 0 mm | 0 mm | 0 mm | 0 mm |
| | | 150° C. × 1 kg | 1 min | 3 min | 3 min | 4 min |
| | Coating properties | Concentration [mass %] | 35 | 35 | 30 | 30 |

TABLE 4

|  |  | Comparative Example 17 | Comparative Example 18 |
|---|---|---|---|
| Monomer composition [g] | St | 18.2 | 0 |
| | MMA | 0 | 18.2 |
| | AA | 1.8 | 1.8 |
| | BA | 80 | 80 |
| Polymerization condition [g] | Ethyl acetate | 200 | 66.7 |
| | ABN-E | 0.5 | 0.02 |
| Random copolymer | Number average molecular weight (Mn) | 66000 | 168000 |
| | Weight average molecular weight (Mw) | 131000 | 649000 |
| | Mw/Mn | 2.0 | 3.9 |
| | Acid value [mgKOH/g] | 17.5 | 17.5 |
| Evaluation | Adhesiveness [N/25 mm] | 25 | 35 |
| | Heat creep resistance 100° C. × 1 kg | 1 min | 3 min |
| | 150° C. × 1 kg | 1 min | 1 min |
| | Coating properties Concentration [mass %] | 35 | 25 |

Abbreviations in Tables 1 to 4 show the following compounds. Further, glass transition point (Tg) of each monomer in the parenthesis is Tg of a homopolymer. Further, the "ratio of unit (1)" in Tables 1 to 3 refers to the content ratio (mass %) of the (meth)acrylic acid ester unit represented by General Formula (1) above in the case where all the structural units constituting the block (B) are set to 100 mass %.

"St": styrene (Tg: 100° C.)
"CHMA": cyclohexyl methacrylate (Tg: 66° C.)
"MMA": methyl methacrylate (Tg: 105° C.)
"MA": methyl acrylate (Tg: 10° C.)
"EMA": ethyl methacrylate (Tg: 65° C.)
"HEA": 2-hydroxyethyl acrylate (Tg: −15° C.)
"HEMA": 2-hydroxyethyl methacrylate (Tg: 55° C.)
"MAA": methacrylic acid (Tg: 228° C.)
"AA": acrylic acid (Tg: 106° C.)
"BA": butyl acrylate (Tg: −54° C.)
"EHA": 2-ethylhexyl acrylate (Tg: −70° C.)

As apparent from Table 1, the adhesive composition of each Example is excellent in adhesiveness, coating properties, and heat creep resistance. Further, since the adhesive composition of each Example is excellent in heat creep resistance, it is not necessary to blend the isocyanate and silane coupling agent, and thus this adhesive composition is also excellent in storage stability.

Whether or not the final product of each Example is a block copolymer was determined as follows.

For example, the number average molecular weight (Mn) of the copolymer (block (A)) obtained in Example 1 was 19000, the weight average molecular weight (Mw) thereof was 30000, and the ratio (Mw/Mn) was 1.6. Meanwhile, the number average molecular weight (Mn) of the block copolymer (X) obtained in Example 1 was 75000, the weight average molecular weight (Mw) thereof was 140000, and the ratio (Mw/Mn) was 1.9.

From these results, it is understood that the molecular weight peak of the copolymer (block (A)) disappears, and the molecular weight of the block copolymer (X) is higher than the molecular weight of the copolymer (block (A)).

Accordingly, in Example 1, it was determined that a block copolymer formed from the copolymer block (block (A)) having a St unit, a HEA unit and an AA unit as structural units and the polymer block (block (B)) having a BA unit as a structural unit was obtained.

Similar determination was also made in Examples 2 to 9 and Comparative Examples 1 to 16.

From the fact that the RAFT agent (R-1) is a dimer of trithiocarbonate, it is considered that the block copolymer (X) obtained in Examples 1 to 9 and Comparative Examples 1 to 11 and 14 to 16 is a triblock copolymer composed of block (A)-block (B)-block (A).

Meanwhile, from the fact that the RAFT agent (R-2) is a monomer of trithiocarbonate, it is considered that the block copolymer (X) obtained in Comparative Examples 12 and 13 is a diblock copolymer composed of block (A)-block (B).

Meanwhile, as apparent from Tables 2 to 4, the adhesive composition of Comparative Example 1 containing a block copolymer in which the ratio of block (A) to block (B) (block (A)/block (B)) is 35/65 was weak in adhesiveness.

Each of the adhesive compositions of Comparative Examples 2 to 4 containing a block copolymer in which an acid value is less than 8 mgKOH/g was inferior in heat creep resistance.

Each of the adhesive compositions of Comparative Examples 5 and 6 containing a block copolymer in which the glass transition point of the block (A) is lower than 75° C. and the block (A) does not contain a monomer unit having a cyclic structure was inferior in heat creep resistance.

Each of the adhesive compositions of Comparative Examples 7 and 8 containing a block copolymer in which the block (B) does not contain an acrylic acid ester unit represented by General Formula (1) above was weak in adhesiveness.

Each of the adhesive compositions of Comparative Examples 9 and 10 containing a block copolymer in which the block (A) does not contain a carboxyl group-containing monomer unit was inferior in heat creep resistance.

The adhesive composition of Comparative Example 11 containing a block copolymer in which the content ratio of the acrylic acid ester unit represented by General Formula (1) above in the block (B) is less than 70 mass % was weak in adhesiveness.

Each of the adhesive compositions of Comparative Examples 12 and 13 containing a block copolymer in which the block (B) is not sandwiched between the blocks (A) was inferior in heat creep resistance.

Each of the adhesive compositions of Comparative Examples 14 to 16 containing a block copolymer in which the block (A) does not contain a monomer unit having a cyclic structure was inferior in heat creep resistance. Particularly, the adhesive composition of Comparative Example 14 containing a block copolymer in which the block (A) does not contain a carboxyl group-containing monomer unit was weak in adhesiveness.

The adhesive composition of Comparative Example 17 containing a random copolymer was inferior in heat creep resistance.

The adhesive composition of Comparative Example 18 containing a random copolymer was inferior in heat creep resistance and coating properties.

The invention claimed is:
1. An adhesive composition, comprising:
a block copolymer (X) that includes a block (A) and a block (B), the block (A) having a glass transition point of 75° C. or higher, the block (A) including a monomer unit having a cyclic structure, a carboxyl group-containing monomer unit, and a hydroxyl group-containing monomer, the block (B) containing an acrylic acid ester unit represented by the following general Formula (1) in an amount of 70 mass % or more, the block copolymer (X) having an acid value of 8 mgKOH/g or more,
wherein a mass ratio of the block (A) to the block (B) (block (A)/block (B)) is 10/90 to 30/70,
the block (A) is located on at least one end of the block copolymer (X),
the block (B) is sandwiched between blocks (A) at said one end of the block copolymer (X),
a content ratio of the monomer unit having the cyclic structure is 50 mass % to 95 mass % when all structural units constituting the block (A) are 100 mass %,
a content ratio of the carboxyl group-containing monomer unit is 3 mass % to 40 mass % when the all structural units constituting the block (A) are 100 mass %,
the block copolymer (X) forms a microphase separation structure by a difference in miscibility of the block (A) and the block (B),
the adhesive composition contains a plurality of block copolymers (X) including the block copolymer (X),
the plurality of the block copolymers (X) include a plurality of blocks (A) including the block (A), and a pseudo-crosslinked structure between the blocks (A) is formed in the block copolymers (X),

$$CH_2=CR^1-COOR^2 \quad (1)$$

(in Formula (1), $R^1$ represents a hydrogen atom, and $R^2$ represents a linear alkyl group having 8 or less carbon atoms or a linear alkoxyalkyl group having 8 or less carbon atoms).

2. The adhesive composition according to claim 1, wherein the monomer unit having the cyclic structure is a monomer unit having an aromatic ring structure.

3. The adhesive composition according to claim 2, wherein the monomer unit having the aromatic ring structure is at least one of an aromatic vinyl compound and a (meth)acrylic acid ester having an aromatic ring structure.

4. The adhesive composition according to claim 3, wherein the aromatic vinyl compound is at least one compound selected from the group consisting of styrene, α-methyl styrene, o-methyl styrene, m-methyl styrene, p-methyl styrene, o-chlorostyrene, m-chlorostyrene, and p-chlorostyrene.

5. The adhesive composition according to claim 3, wherein the (meth)acrylic acid ester having the aromatic ring structure has at least one of benzyl (meth)acrylate and 2-phenoxyethyl (meth)acrylate as an aromatic ring structure.

6. The adhesive composition according to claim 1, wherein the acid value of the block copolymer (X) is 8 to 50 mgKOH/g.

7. The adhesive composition according to claim 1, wherein the block copolymer (X) contains a compound derived from a RAFT agent selected from the group consisting of dithioester, dithiocarbonate, trithiocarbonate, and xanthate.

8. The adhesive composition according to claim 1, wherein a crosslinking agent is not contained in the adhesive composition.

9. The adhesive composition according to claim 1, wherein the monomer unit having the cyclic structure is a monomer unit having an alicyclic structure.

10. The adhesive composition according to claim 9, wherein the monomer unit having the alicyclic structure is a (meth)acrylic acid ester having an alicyclic structure.

11. The adhesive composition according to claim 9, wherein the monomer unit having the alicyclic structure is at least one compound selected from the group consisting of cyclohexyl (meth)acrylate, dicyclopentanyl (meth)acrylate, and isobornyl (meth)acrylate.

12. The adhesive composition according to claim 1, wherein a content ratio of the hydroxyl group-containing monomer is 0.1 mass % to 10 mass % when the all structural units constituting the block (A) are 100 mass %.

13. The adhesive composition according to claim 1, wherein the hydroxyl group-containing monomer is at least one compound selected from the group consisting of 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxymethylcyclohexyl) methyl acrylate.

* * * * *